US008358328B2

(12) United States Patent  
Friel et al.

(10) Patent No.: US 8,358,328 B2
(45) Date of Patent: Jan. 22, 2013

(54) MULTIPLE VIDEO CAMERA PROCESSING FOR TELECONFERENCING

(75) Inventors: Joseph T. Friel, Ardmore, PA (US); J. William Mauchly, Berwyn, PA (US)

(73) Assignee: Cisco Technology, Inc., San Jose, CA (US)

( * ) Notice: Subject to any disclaimer, the term of this patent is extended or adjusted under 35 U.S.C. 154(b) by 821 days.

(21) Appl. No.: 12/275,119

(22) Filed: Nov. 20, 2008

(65) Prior Publication Data

US 2010/0123770 A1    May 20, 2010

(51) Int. Cl.
H04N 7/15    (2006.01)
(52) U.S. Cl. .................. 348/14.08; 348/14.01
(58) Field of Classification Search ............... 348/14.08, 348/14.09, 14.01
See application file for complete search history.

(56) References Cited

U.S. PATENT DOCUMENTS

| | | | | |
|---|---|---|---|---|
| 6,577,333 | B2 * | 6/2003 | Tai et al. | 348/14.08 |
| 6,583,808 | B2 | 6/2003 | Boulanger et al. | 348/14.09 |
| 6,704,048 | B1 | 3/2004 | Malkin et al. | 348/240.2 |
| 6,795,558 | B2 * | 9/2004 | Matsuo | 348/14.09 |
| 2002/0023133 | A1 | 2/2002 | Kato et al. | 709/205 |
| 2002/0140804 | A1 | 10/2002 | Colmenarez et al. | 348/14.08 |
| 2002/0149672 | A1 | 10/2002 | Clapp et al. | 348/14.09 |
| 2003/0193584 | A1 | 10/2003 | Malkin et al. | 348/252 |
| 2004/0263636 | A1 | 12/2004 | Cutler et al. | 348/211.12 |
| 2005/0237376 | A1 | 10/2005 | Roessler et al. | 348/14.04 |
| 2007/0120971 | A1* | 5/2007 | Kennedy | 348/14.16 |
| 2007/0279484 | A1* | 12/2007 | Derocher et al. | 348/14.09 |
| 2008/0246833 | A1* | 10/2008 | Yasui et al. | 348/14.08 |

FOREIGN PATENT DOCUMENTS

| | | |
|---|---|---|
| WO | WO 94/16517 | 7/1994 |
| WO | WO 2008/101117 | 8/2008 |

OTHER PUBLICATIONS

Chen et al. "Toward a compelling sensation of telepresence: demonstrating a portal to a distant (static) office" Proceedings Visualization 2000. VIS 2000. Salt Lake City, UT, Oct. 8-13, 2000; [Annual IEEE Conference on Visualization], Los Alamitos, CA : IEEE Comp. Soc, US, Jan. 1, 2000, pp. 327-333.
PCT Search Report for PCT Application No. PCT/US2009/064061.
X. Sun, J. Foote, D. Kimber, and B.S. Manjunath: "Region of Interest Extraction and Virtual Camera Control Based on Panoramic Video Capturing," IEEE Trans. Multimedia, vol. 7 No. 5, pp. 981-990, Oct. 11, 2005.
J. Foote, and D. Kimber: "FlyCam: Practical Panoramic Video and Automatic Camera Control" in Proceedings of IEEE International Conference on Multimedia and Expo, vol. III, pp. 1419-1422, Jul. 30, 2000.

(Continued)

Primary Examiner — Stella Woo
(74) Attorney, Agent, or Firm — Dov Rosenfeld; Inventek

(57) ABSTRACT

A method, an apparatus, and a storage medium with executable code to execute a method including accepting camera views of at least some participants of a teleconference, each view from a corresponding video camera, with the camera views together including at least one view of each participant. The method includes accepting audio from a plurality of microphones, and processing the audio from the plurality of microphones to generate audio data and direction information indicative of the direction of sound received at the microphones. The method further includes generating one or more candidate people views, with each people view being of an area enclosing a head and shoulders view of at least one participant. The method also includes making a selection, according to the direction information, of which at least one of the candidate people views are to be transmitted to one or more remote endpoints.

20 Claims, 12 Drawing Sheets

OTHER PUBLICATIONS

L. He, M. Cohen, and D. Salesin, "The Virtual Cinematographer: A Paradigm for Automatic Real-Time Camera Control and Directing," Proc. SIGGRAPH, pp. 217-224, 1996.

Z. Liu and M. Cohen, "Head-Size Equalization for Better Visual Perception of Video Conferencing," Proceedings, IEEE International Conference on Multimedia & Expo(ICME2005), Jul. 6-8, 2005, Amsterdam, The Netherlands, retrieved on Sep. 26, 2008 at http://research.microsoft.com/users/cohen/HeadSizeEqualizationICME2005.pdf.

H.-Y. Shum, and S.B. Kang, "A Review of Image-Based Rendering Techniques," in SPIE Proceedings vol. 4067 (3), pp. 2-13, Proceedings of the Conference on Visual communications and image processing 2000, Perth, Australia, Jun. 20-23, 2000.

S. Mann and R. Picard, "Virtual bellows: constructing high quality still from Video," Proceedings, First IEEE International Conference on Image Processing ICIP-94, vol. 1, Nov. 13-16, 1994, pp. 363-367, Austin Texas, Nov. 1994.

* cited by examiner

MULTIPLE VIDEO CAMERA PROCESSING FOR TELECONFERENCING

FIELD OF THE INVENTION

The present disclosure relates generally to videoconferencing systems.

BACKGROUND

Today's videoconferencing systems have improved in quality to provide a sense of remote conference participants being present. Hence they are commonly called "telepresence systems." One example is the CISCO CTS3000 Telepresence system, by Cisco Systems, Inc. In a videoconferencing room set up for such a videoconferencing system, seating locations are fixed. Cameras have a fixed focus, zoom, and angle to reproduce each member in a life-size "close-up" on the matched video display.

Customers have other conference rooms that they would like to use for telepresence conferencing. In these rooms, the seating locations may vary greatly from meeting to meeting.

Some existing telepresence systems use actual pan-tilt-zoom (PTZ) and/or electronic PTZ (EPTZ) cameras. Whether actual pan-tilt-zoom, or electronic, the cameras must be manually steered by a person to achieve a good view. While this is bothersome with one camera, it becomes untenable in a multi-camera situation. Thus, it is desirable to use a plurality of cameras that automatically seek out good close-up people views of each participant.

DESCRIPTION OF EXAMPLE EMBODIMENTS

Overview

Figure 1A:
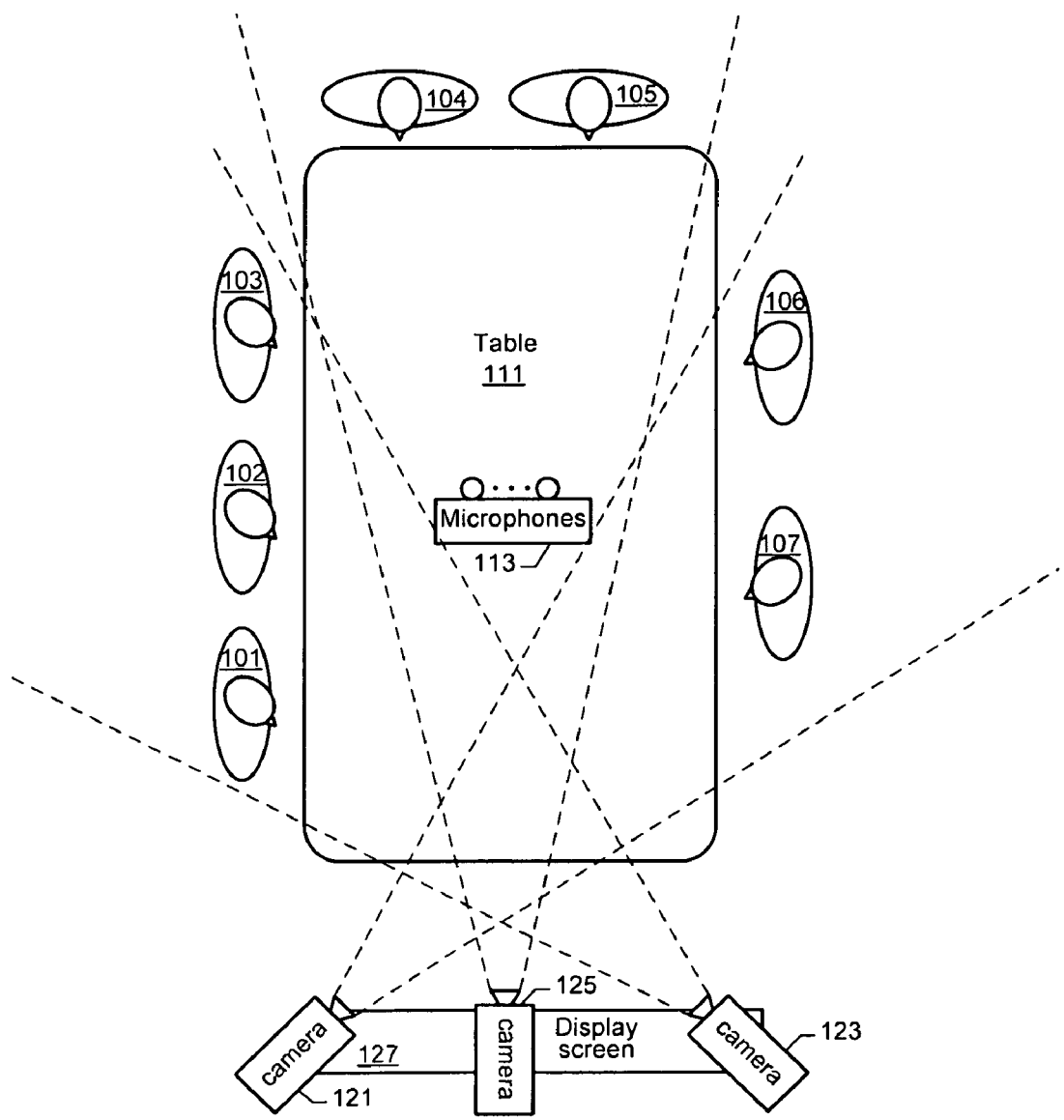
FIG. 1A shows a top view of a first example arrangement of a conference room in which three cameras are used for videoconferencing according to an embodiment of the present invention.

Conventional teleconference systems used in a standard conference room typically show a wide angle group people view.

Described herein is a teleconference system with video camera that adapts to the seating positions of a number of people in a room. One or more wide-angle cameras capture wide angle camera views of the participants, who, e.g., are around a table. In one embodiment, each face is located by a combination of audio and video information. People shots are composed or selected as if there is a set of "virtual" close-up cameras each producing a people view. The people views generated by the virtual cameras are then used in a teleconference, e.g. a teleconference using multiple display screens. The system does not require a fixed seating arrangement, because it automatically analyzes the scene and positions the virtual electronic pan-tilt-zoom cameras to capture a correct "head and shoulder" people view. Embodiments of the system can produce one or multiple video output streams each containing one or multiple people without requiring a fixed seating arrangement.

A feature of some embodiments is that the system can be dynamically deployed. That is, it is not necessary to permanently mount it in a specific location, but rather it may be moved to whatever room is convenient.

Thus, embodiments of the present invention include an apparatus and a method, can add electronic pan-tilt-zoom function and multiple view capability to a simple telepresence system.

Particular embodiments include an apparatus comprising a plurality of video cameras each configured to capture a respective camera view of at least some participants of a conference. The camera views together including at least one view of each participant. The apparatus further includes a plurality of microphones and an audio processing module coupled to the plurality of microphones and configured to generate audio data and direction information indicative of the direction of sound received at the microphones. The apparatus also includes a composition element coupled to the video cameras and configured to generate one or more candidate people views, each people view being of an area enclosing a head and shoulders view of at least one participant. The apparatus also has a video director element coupled to the composition module and to the audio processing module and configured to make a selection, according to the direction information, of which at least one of the candidate people views are to be transmitted to one or more remote endpoints.

In one version of the apparatus, the cameras are set to each generate a candidate people view. The composition element is configured to make a selection of which at least one camera views is to be transmitted to the one or more remote endpoints according to the direction information. The apparatus in such a version also includes a video selector element coupled to the video director and to the video cameras and configured to switch in, according to the selection by the video director, at least one of the camera views for compression and transmission to one or more remote endpoints.

Other versions of the apparatus further include a face detection element coupled to the cameras and configured to determine the location of each participant's face in each camera view and to output the determined location(s) to the composition element. The camera views in these versions are not necessarily people views. The composition module is coupled to cameras via the face detection element, and further configured to generate according to the determined face locations, one or more candidate people views, each candidate people view being of an area enclosing a head and shoulders view of at least one participant, and to output to the video director candidate view information. In such versions, the video director is further configured to output selected view information according to the selection by the video director, and the apparatus further includes an electronic pan-tilt-zoom element coupled to the video director and to the video cameras and configured to generate, according to the selection selected view information, video corresponding to the selected at least one of the candidate views for compression and transmission to one or more remote endpoints.

Each participant appears in only one people view, or each participant may appear in more than one people view, in which case, the composition element includes a first composition element configured to compose people views, and a second composition element configured to select the candidate people views from the composed people view, such that each participant appears in only one candidate people view.

Particular embodiments include a method of operating a processing system. The method includes accepting a plurality of camera views of at least some participants of a conference. Each camera view is from a corresponding video camera, with the camera views together including at least one view of each participant. The method includes accepting audio from a plurality of microphones, and processing the audio from the plurality of microphones to generate audio data and direction information indicative of the direction of sound received at the microphones. The method further includes generating one or more candidate people views, with each people view being of an area enclosing a head and shoulders view of at least one participant. The method also includes making a selection, according to the direction information, of which at least one of the candidate people views are to be transmitted to one or more remote endpoints.

In one version, the accepted camera views are each a candidate people view, and the method further includes, in response to the made selection, switching in at least one of the accepted camera views for compression and transmission to one or more remote endpoints.

Other versions include detecting any faces in the camera views and determining the location of each detected face in each camera view. In such versions, the camera views are not necessarily people views, and the generating of the one or more candidate people views is according to the determined face locations, such that each candidate people view is of an area enclosing a head and shoulders view of at least one participant, the generating determining candidate view information. Furthermore, making the selection according to the direction information includes providing selected view information according to the made selection. Such versions include generating according to the selected view information, video corresponding to the selected at least one of the candidate views for compression and transmission to one or more remote endpoints.

In one case, each participant appears in only one people view. In other cases, each participant may appear in more than one people view, and the method for such versions further includes composing possible people views, and selecting the candidate people views from the composed possible people view, such that each participant appears in only one candidate people view.

Particular embodiments include a method of operating a processing system. The method includes, for a plurality of camera views from corresponding video cameras in a room, detecting any faces in the camera view, determining the location of participants in the room, determining which face or faces is or are in more than one camera view, and for each subgroup of one or more adjacent faces, composing a people view, selecting respective people views for each respective participant, mapping each people view to one or more determined voice directions, such each determined voice direction is associated with one of the people views; and selecting one or more people views for transmission to remote endpoints, such that video for the people views selected for transmission can be formed.

In some such method, when a voice direction changes, the method includes switching between people views according to the sound direction.

Particular embodiments include a computer-readable medium having encoded thereon executable instructions that when executed by at least one processor of a processing system cause carrying out a method. The method includes, for a plurality of camera views from corresponding video cameras in a room, detecting any faces in the camera view, determining the location of participants in the room, determining which face or faces is or are in more than one camera view, and for each subgroup of one or more adjacent faces, composing a people view, selecting respective people views for each respective participant, mapping each people view to one or more determined voice directions, such each determined voice direction is associated with one of the people views; and selecting one or more people views for transmission to remote endpoints, such that video for the people views selected for transmission can be formed.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

The Embodiments

Embodiments of the present invention use two or more wide-angle cameras, e.g., high definition video cameras. Some embodiments and electronic pan-tilt-zoom applied to one or more of the camera views with face detection to determine one or more close-up views, each of one or more, e.g., two or three of the participants.

Figure 1B:
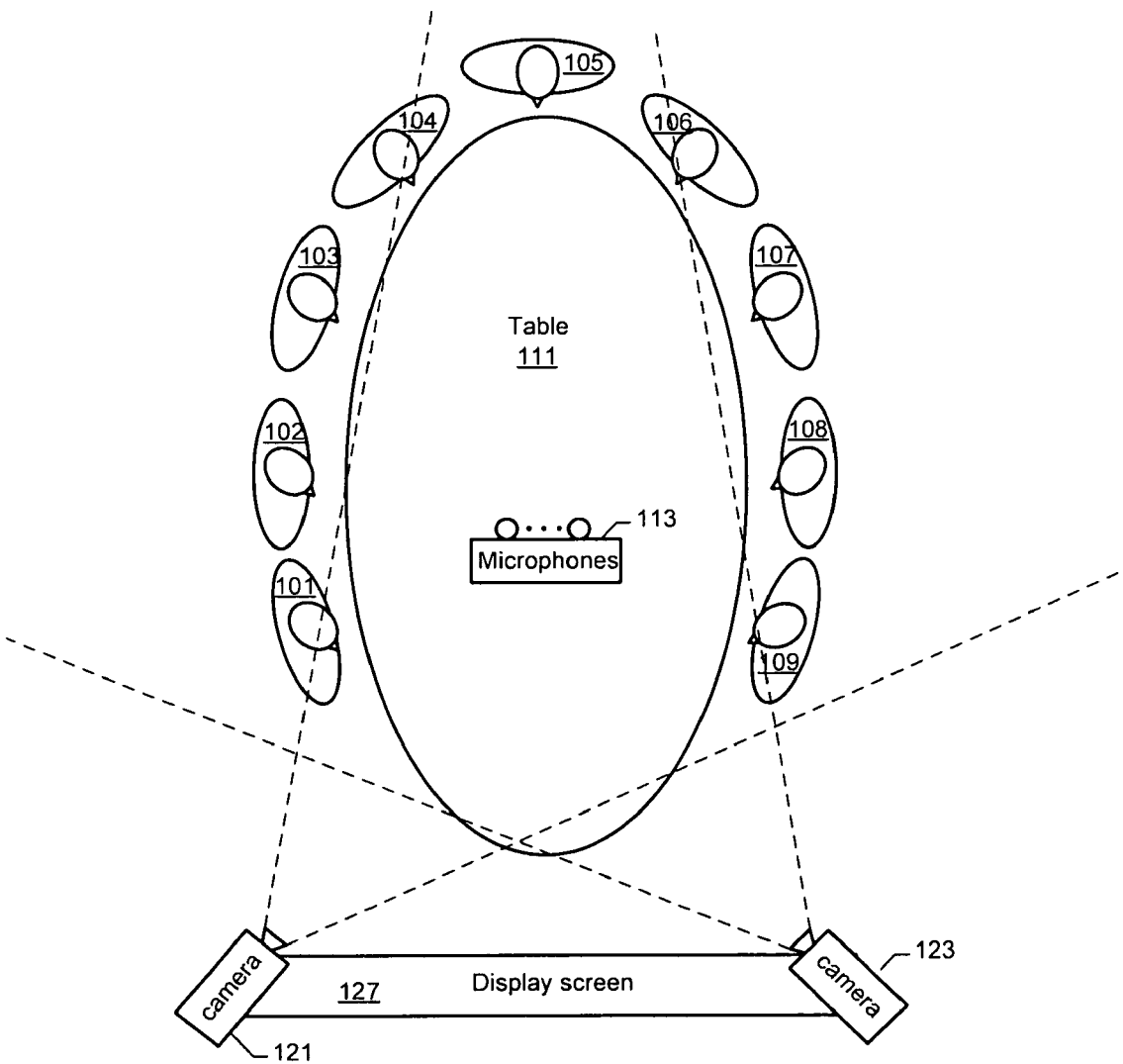
FIG. 1B shows a top view of a second example arrangement of a conference room in which two cameras are used for videoconferencing according to an embodiment of the present invention.
Figure 1C:
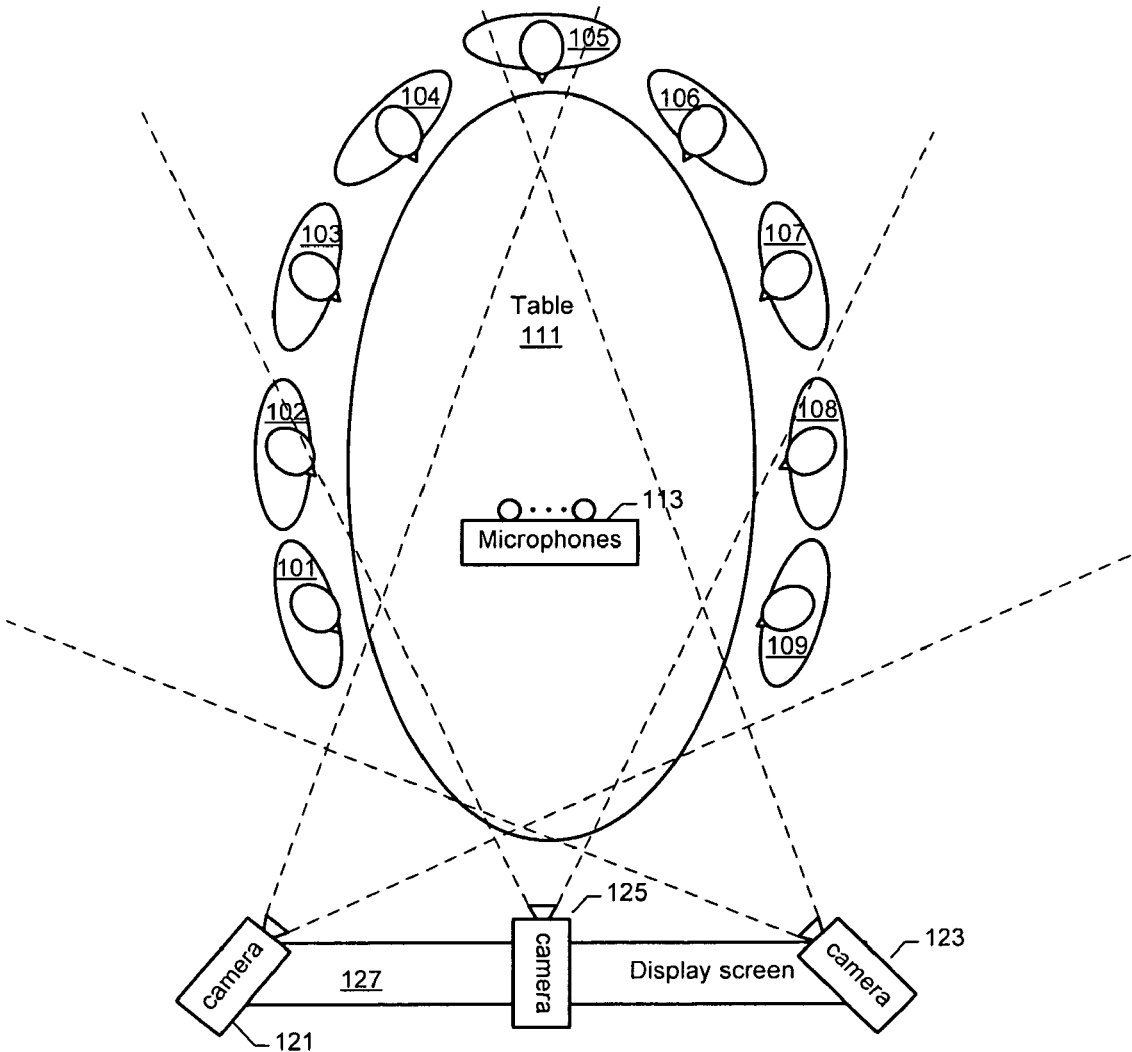
FIG. 1C shows a top view of a third example in which three video cameras 121, 123, and 125 are used for videoconferencing according to an embodiment of the present invention.

FIG. 1A shows a top view of a first example arrangement of a conference room in which three cameras 121, 123, and 125 are used for videoconferencing according to a first embodiment of the present invention. At least one display screen 127 is located at one end of the conference room in which a table 111 is positioned. FIG. 1B shows a top view of a second example arrangement of a conference room in which two cameras 121, 123 are used for videoconferencing according to an embodiment of the present invention, while FIG. 1C shows a top view of a third example in which three video cameras 121, 123, and 125 are used. The display is usually in landscape orientation, showing one or two people side-byside and life-size, vertically positioned so that the image of their eyes are at the same elevation as the people in the room. The table is a typical conference room table, which might be an elongated table, e.g., a rectangular table as shown in FIG. 1A, or, as shown in FIGS. 1B and 1C, an oval table. Participants 101, 102, 103, 104, 105, 106, and 107 in FIG. 1A, and 101, 102, 103, 104, 105, 106, 107, 108, and 109 in each of FIGS. 1B and 1C are around the table. A plurality of cameras is used in a cross-fire arrangement to provide wide angle camera views that in some arrangements, e.g., those of FIGS. 1B and 1C overlap so that each participant is in at least one view. In FIG. 1A, each participant is in exactly one camera view, while in the arrangements of FIG. 1B or 1C there may be a least one participant who is in more than one view. Furthermore, the cameras are angled so that each participant's face is in at least one wide-angle view. Thus, for example, if there are participants on opposite sides of the table, by angling the cameras, each such participant's face is in at least one view.

Modern videoconferencing systems that use high-definition video cameras in especially configured rooms are often called telepresence systems because they provide for the participants around the table life size images of remote participants on the at least one display screen, as if the remote participants are present. The display is usually in landscape orientation, showing one or two people side-by-side and life-size, vertically positioned so that the image of their eyes are at the same elevation as the people in the room. One mechanism is to set up a video conferencing room with a plurality of cameras fixed and located around the room in a radial manner, or spaced apart and pointed out parallel to each other and perpendicular to the display(s), such when the participants sit around a conference table, a people view of the head and shoulders of each participant is obtained suitable for displaying on a remote screen to give the impression that the participant or participants is/are present at the remote location.

One feature of embodiments of the present invention is providing the same effect with a less expensive arrangement of the plurality of cameras set up near the display screen(s) at angles arranged to capture wide-angle views as shown in the example arrangements of FIGS. 1A-1C. In one example, the cameras are near the display; with two cameras near the two sides of the display and if there is a third camera (or only one camera), it is centered directly over the display. The cameras are approximately at eye level of the participants, and may be, in one example, 18 inches from either side of the display.

Figure 2:
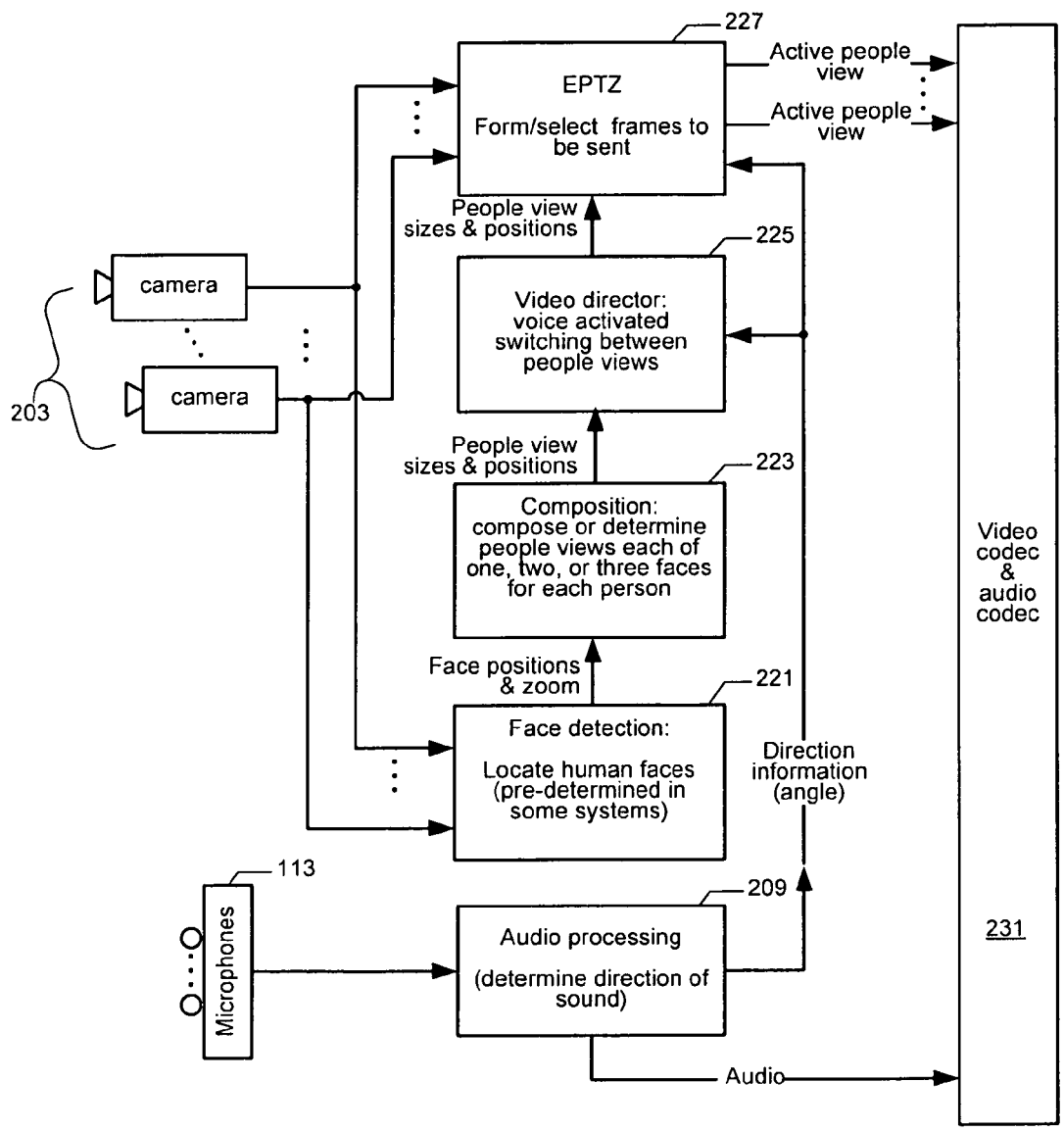
FIG. 2 shows a simplified functional block diagram of one embodiment of the invention, applicable, for example, to the arrangement of participants shown in FIG. 1A.

FIG. 2 shows a simplified functional block diagram of one embodiment of the invention, applicable, for example, to the arrangement of participants shown in FIG. 1A. A plurality of cameras 203, e.g., high definition video cameras that each provide a resolution with at least 600 lines of video, e.g., with 1920×1080 at 60 frames per second, are arranged such that each camera view shows two or at most three people side by side and close up. In one embodiment, each camera has a fixed wide-angle view. The depth of field is arranged fir the participants sitting at the table 111 such that for each participant, there is at least one camera that has the participant's face view in focus.

In a first version, the framing is adjusted per camera such that each frame is suitable for a people view of the head and shoulders of the participants suitable for displaying on a remote screen to give the impression that the participant or participants is/are present at the remote location. Each camera view has one, two or possibly three participants. In such an embodiment, every participant appears in one and only one camera view. The cameras are arranged such that the two or three participants that appear in a camera's people view do not significantly obscure each other. A particular participant is captured by the camera position that is farthest away from him or her, which is also the position closest to a "frontal" people view of that participant. In the first version, the framing is adjusted per camera such that camera view has one, two or possibly three participants, already framed to be suitable to a people view.

In a second version, the framing is not necessarily adjusted per camera such that camera view is a people view. Some additional composition may be needed. The cameras are again arranged such that the two or three participants that appear in a camera view's people view(s) do not significantly obscure each other. The people views are such that each person appears in only one people view. A particular participant is captured by the camera position that is farthest away from him or her, which is also the position closest to a "frontal" people view of that participant. Because in this second version, the framing may not necessarily be a people view of the head and shoulders of the participants suitable for displaying on a remote screen to give the impression that the participant or participants is/are present at the remote location, electronic composition is carried out to achieve such functions.

In both versions, a directional microphone subsystem includes two or more microphones 113, arranged, for example as a microphone array and an audio processing module 209 coupled to the microphones and configured to generate audio data and direction information indicative of the direction of sound received at the microphones. In one example embodiment, the direction information is in the form of the angle of sound. Thus, the microphones are used to capture the audio of each participant clearly and the audio processing is used to determine in which of the people views a participant is speaking. There is no correspondence necessary in such an arrangement between a microphone and a person, as there would be if each participant was provided with a separate microphone.

One aspect of the invention is applicable to such arrangements, and includes a method of determining which camera view shows the current speaker, in cases where there is not a one-to-one correspondence between microphones and camera views.

In the first arrangement in which the framing is pre-set for the people view, and in which each participant appears in one and only one camera view, the orientation, framing and scale of each camera, e.g., the location of each person relative to that camera is arranged such that participants' eye levels and the people view for such a camera shows two or at most three people in a head and shoulders view that would scale to be life size in a typical teleconference room display screen. In such an arrangement, the composition module 223 generates information as to which direction is associated with which camera view (a people view in this case).

A video director element 225 is coupled to the composition module 223 and to the audio processing module and configured to make a selection, according to the direction information, of which at least one of the candidate people views are to be transmitted to one or more remote endpoints.

The video director outputs information to a video selector element 227 to select, according to the selection by the video director, at least one of the camera views for compression and transmission together with a processed version of the audio data to one or more remote endpoints. The selected camera view(s) correspond(s) to the selected candidate people view(s) and become(s) the active people view(s) sent to remote endpoints of the teleconference.

In the second arrangement that includes electronic composition, i.e., when each camera view is not necessarily framed directly as a people view, a face detection element 221 accepts the camera views and locates the faces in each camera view. A composition module 223 is coupled to the face detection element 221 and configured to generate candidate people views, with one person in only one candidate people view, and typically, one per camera, each people view being of an area enclosing a head and shoulders view of at least one participant, typically two or three participants. In one embodiment, the composition module is arranged such that each people view provides images of a size and layout such that when displayed remotely on a remote display screen, each participant is displayed life size and facing the expected audience in the remote location where the remote display screen is situated. The composition element composes, using information on the frame border locations and on the location and sizes of the heads, the candidate people views, and outputs candidate view information, e.g., in the form of people view size and positions relative to the corresponding camera view frame. These are the possible candidate people views.

The video director element 225 is coupled to the composition module 223 and to the audio processing module and configured to make a selection, according to the direction information, of which at least one of the candidate people views are to be transmitted to one or more remote endpoints. As soon as a participant speaks, any change in directional information causes the video director to switch its selection to include the people view that contains the participant who is speaking. One method uses a two-dimensional overhead mapping of the location of the participants in the room for making the selection. The video director element 225 outputs selected candidate view information, e.g., in the form of the selected people view size(s) and position(s) relative to the corresponding camera view frame such that an electronic real-time electronic pan-tilt-zoom (EPTZ) element 227 can form a high definition video frame(s) from the corresponding camera view(s) according to the selection by the video director element. The real time electronic pan-tilt-zoom element 227 is configured to form, e.g., using video rate interpolation, a high definition video frame for each selected people view to be the active people view(s) sent to remote endpoints of the teleconference.

A video codec and audio codec subsystem 231 is configured to accept the audio and the selected one or more active people video views, and in some embodiment, any other views and to compress the video and audio for transmission to the other endpoints of the video teleconference.

The invention is not limited to any particular architecture for the codecs. In one embodiment, the codec subsystem 231 encodes the video in high definition at 60 frames per second.

A second set of embodiments is applicable for the case wherein each camera view is a wide angle view that need not be restricted to be a people view or that need not be limited such that each participant can appear in one and only one camera view. The arrangements shown in FIGS. 1B and 1C have overlapping camera views that might have the same participant in more than one camera view. Electronic pan-tilt-zoom (EPTZ) is used to create the people views by processing of the video signals in real time, with each people view displaying one, or more typically two or three, e.g., not more than three participants suitable for transmission to the remote endpoints. Face detection is used to detect the participants in each camera view. In these arrangements, again, a number of microphones are used, in order to capture the audio of each participant clearly and to be able to determine which participant is speaking. In one embodiment, the plurality of microphones is arranged as a microphone array 113 together with an audio processing module configured to associate particular people views with the sensed sounds such that when a particular participant speaks, the constructed people view that includes the best view of that participants is selected one of the at least one people view that is transmitted to the other endpoints in the teleconference.

Figure 3:
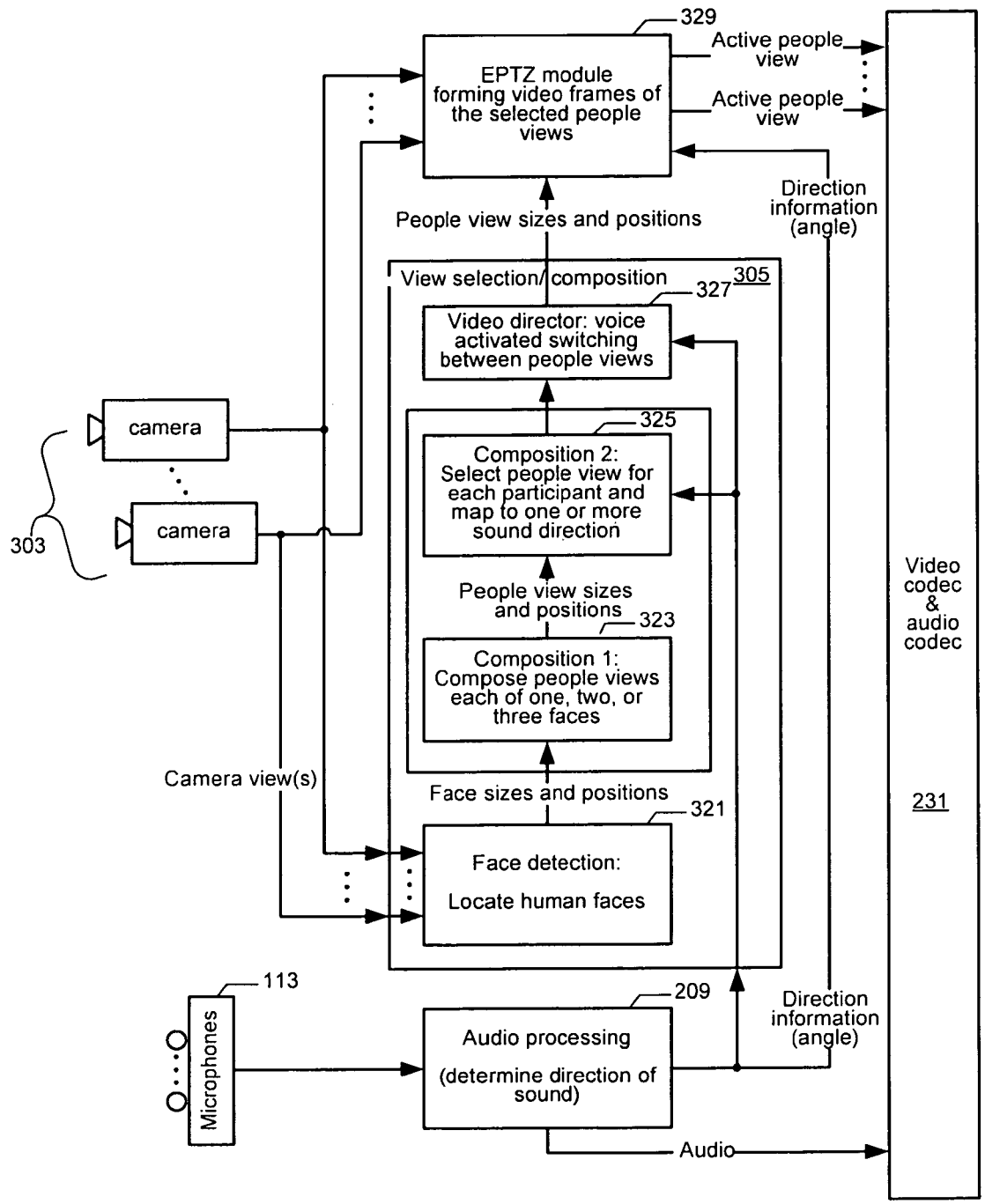
FIG. 3 shows a simplified functional block diagram of one embodiment of the invention, applicable, for example, to the arrangements of participants shown in FIGS. 1B and 1C.

FIG. 3 shows a simplified functional block diagram of one embodiment of the invention, applicable, for example, to the arrangements of participants shown in FIGS. 1B and 1C. A plurality of cameras 303, e.g., high definition video cameras is arranged such that each camera view overlaps so that together, the camera views show all participants. The camera views are wide-angle, and it is possible and likely that one or more participants appear in more than one camera view.

A view selection/composition element 305 includes a face detection element 321 to locate the human faces within each of the camera views, a first composition element 323 ("composition 1") that is coupled to the face detection element 321, and configured to accept face size and positions of the camera views, and compose from the camera views people views of one, two, or three faces. The composition module 323 is arranged such that each people view provides images of a size and layout such that when displayed remotely on a remote display screen, each participant is displayed life size and facing the expected audience in the remote location where the remote display screen is situated. The output of the composition element 323 in one embodiment includes people view information, e.g., in the form of the sizes and locations of the people view(s) relative to the framing of the corresponding camera view(s).

The view selection/composition element 305 further includes a second composition element 325 ("composition 2") that is a people view selection element 325 configured to accept people view information, e.g., people view size(s) and position(s) relative to the framing of the corresponding camera view(s) from the composition element 323 and to select the people view for each participant to form candidate people views. The output of the people view selection element 325 is in the form of candidate people view information for each candidate people view, e.g., candidate people view size(s) and position(s) relative to the framing of the corresponding camera view(s).

Thus the first and second composition elements 325 and 327 together form a composition element that is configured to generate candidate people views.

A directional microphone subsystem includes two or more microphones 113, arranged, for example as a microphone array and an audio processing module 209 coupled to the microphones and configured to generate audio data and direction information indicative of the direction of sound received at the microphones. In one example embodiment, the direction information is in the form of the angle of sound. Thus, the microphones are used to capture the audio of each participant clearly and the audio processing is used to determine in which of the people views a participant is speaking.

Many methods of determining the direction of a sound using a plurality of microphones are known in the art, and the invention is not limited to any particular method.

One aspect of the invention is applicable to such an arrangement, and includes a method of mapping, e.g., in the people selection element 325, which of the selected people views to use for which sound direction.

A video director element 327 is coupled to the second composition elements (the people selection element) 325 and to the audio processing module and configured to make a selection, according to the direction information, of which at least one of the candidate people views are to be transmitted, the selection in the form of information for real-time video composition in an electronic pan tilt zoon (EPTZ) element 329, and for compression and transmission ion with a processed version of the audio data to one or more remote endpoints. As soon as a participant speaks, any change in directional information causes the video director 327 to switch its selection to include the people view that contains the participant who is speaking. One method uses, for selection, a two-dimensional overhead map of the participant locations in the room. The output of the video director is in the form of the people view information for the one or more, typically one people view that is to be transmitted, e.g., as people view size(s) and position(s) relative to the framing of the corresponding camera view(s).

An electronic pan tilt zoom (EPTZ) element 329 is coupled to the view selection/composition module 305, in particular to the video director 327 and to the video outputs of the video cameras 303, and forms, at video rate, the video frames of the people views according to the people view information. This forms the video signal(s) for the active video view(s).

A video codec and audio codec subsystem 231 is configured to accept the audio and the video signal(s) for the active video view(s), and in some embodiment, any other views and to compress the video and audio for transmission to the other endpoints of the video teleconference. The invention is not limited to any particular architecture for the codecs. In one embodiment, the codec subsystem 231 encodes the video in high definition at 60 frames per second.

Note that some existing telepresence systems also use a face detection mechanism. In such a system, if a face is detected, the face detection system determined the size and position of a detected face within the view of the camera is used to steer the camera. Older systems might use a separate wide angle camera and close up pan-tilt-zoom (PTZ) camera. Some systems might simulate this with electronic pan-tilt-zoom that is used to track the location of the speaker and direct the pan-tilt-zoom view to that person. Such tracking approaches differ from those of the present invention by at least the difference that in embodiments of the present invention, for a "telepresence" experience, the people views are constrained and kept fixed during the duration of a teleconference session. That is, every time a particular participant shows up, that participant is in the same place to simulate fixed cameras used.

Thus, in embodiments of the present invention, the direction of sound does not steer an actual or virtual camera, but rather chooses between several fixed virtual (EPTZ) camera views obtained by the composition module and selected by the people selection module such that each person appears in one and only one selected composed people view. Face detection does not directly steer the PTZ, which would only produce simple close-ups of a face in the center of the picture. Each face is ultimately located by a combination of audio and video information. The system is capable of producing multiple video output streams containing multiple people, and yet it does not require a fixed seating arrangement.

The high definition video cameras have at least 1280 by 620 at 60 frames per second, and in some embodiments, 1920×1080 at 60 frames per second. The cameras are arranged to provide fixed, wide-angle views to maintain reasonable image quality even if only a portion of the image is selected. In one embodiment, the cameras have a relatively large depth-of-field so as to keep all participants in its camera view in focus.

The cameras are placed slightly above eye level.

Thus the system of the present invention automatically composes people views and chooses between them to generate the life-size, close-up experience of a multi-camera Telepresence system. This process allows a relatively small number of cameras—even a single camera to behave as if there were a much larger number of virtual cameras present.

Figure 4:
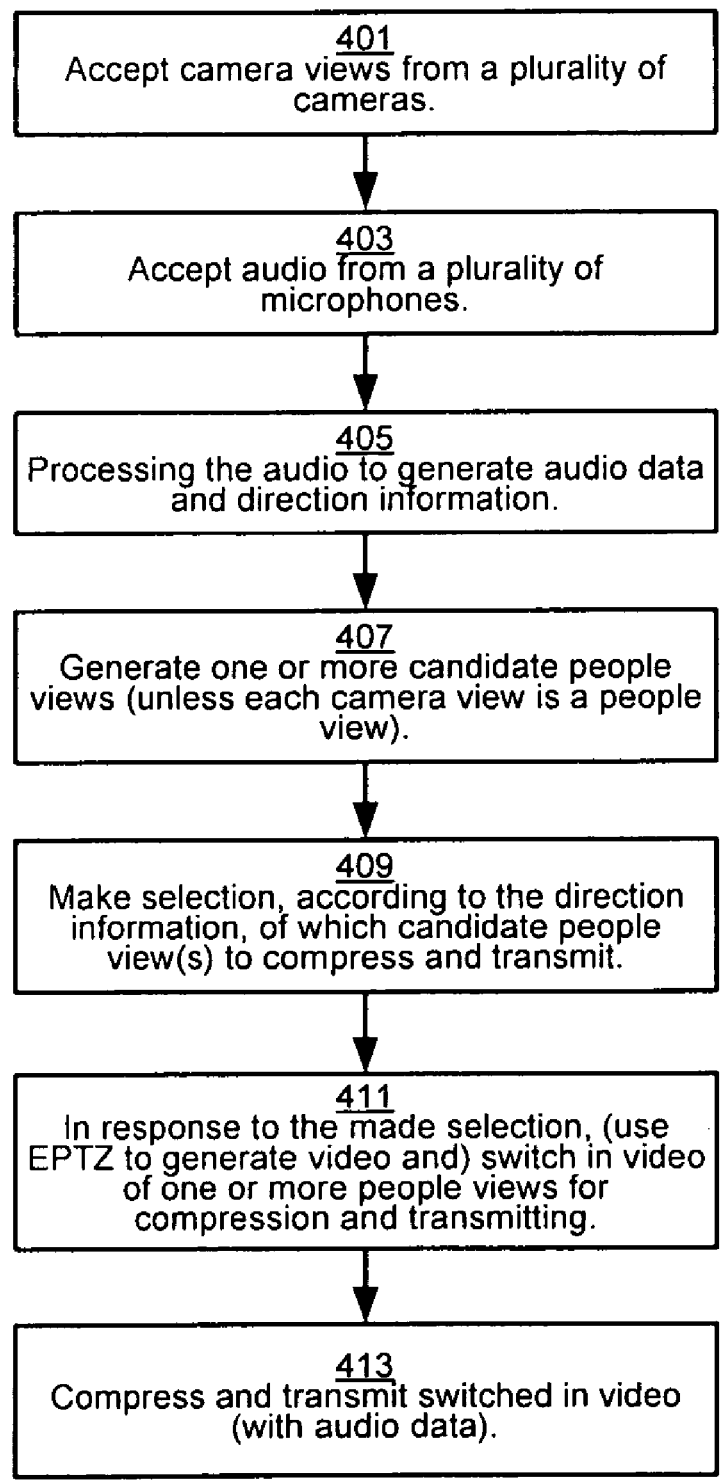
FIG. 4 shows a flowchart of a method embodiment of operating a processing system according to an embodiment of the present invention.

FIG. 4 shows a flowchart of one method embodiment of operating a processing system. The method includes in 401 accepting a plurality of camera views of at least some participants of a conference. Each camera view is from a corresponding video camera, with the camera views together including at least one view of each participant. The method also includes in 403 accepting audio from a plurality of microphones and in 405 processing the audio from the plurality of microphones to generate audio data and direction information indicative of the direction of sound received at the microphones.

The method includes in 407 generating one or more candidate people views, each people view being of an area enclosing a head and shoulders view of at least one participant. In one version, the accepted camera views are each a candidate people view. That is, the cameras are pre-framed to provide people views. 407 in such a case is a trivial step.

In other versions, the camera views are not necessarily pre-set to be people views, in which case the method further includes, in 407, detecting any faces in the camera views and determining the location of each detected face in each camera view. The generating of the one or more candidate people views in 407 is according to the determined face locations, such that each candidate people view is of an area enclosing a head and shoulders view of at least one participant, the generating determining candidate view information.

The method includes in 409, making a selection, according to the direction information, of which at least one of the candidate people views are to be transmitted to one or more remote endpoints. In the case that the camera views are not necessarily each a people view, making the selection according to the direction information includes providing selected view information according to the made selection The method further includes in a 411, in response to the made selection, switching in at least one of the accepted camera views for compression and transmission to one or more remote endpoints. In the case that the camera views are not necessarily each a people view, the method includes generating according to the selected view information, video corresponding to the selected at least one of the candidate views for compression and transmission to one or more remote endpoint. The generating uses EPTZ.

The method further includes in a step 413, compressing the switched in video, and the audio data, and transmitting the compressed data to one or more endpoints In one version in which the camera views are not necessarily each a people view, each participant appears in only one people view. In another version, each participant may appear in more than one people view. In such a case 407 further includes composing possible people views, and selecting the candidate people views from the composed possible people view, such that each participant appears in only one candidate people view.

Figure 5:
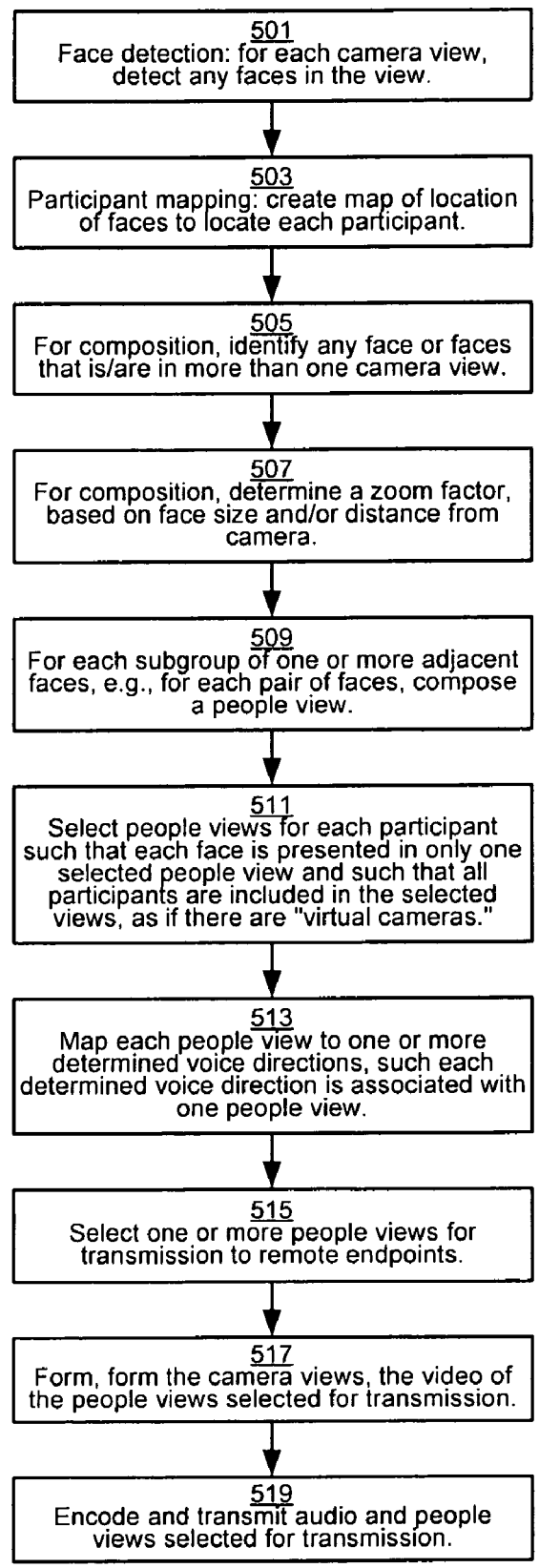
FIG. 5 shows a flowchart of another method embodiment of operating a processing system according to an embodiment of the present invention.

FIG. 5 shows a flowchart of another method embodiment of operating a processing system. The method includes in a face detection step 501, for each camera view from a corresponding view camera in a room, detecting any faces in the camera view. The method further includes, in step 503, determining the location of the participants in the room, e.g., creating a map of the location of faces in the room to locate each participant.

The method further includes, in step 505, for composition, determining which face or faces is or are in more than one camera view. That is, detecting the image of each participant who is in more than one camera view. The method further includes, in step 507, again for composition, determining a zoom factor, e.g., for each face, based on face size and/or distance from camera.

In step 509, the method further includes, for each subgroup of one or more adjacent faces, e.g., for each pair of faces, or subgroup of three faces, composing a people view. In one embodiment, for the case of two participants in each people view, the zoom for the people view is the average of the zoom factors for the two individual faces. The composition of the people view contains the subgroup of faces inside the people view, e.g., without touching a perimeter band.

In a step 511, the method includes selecting respective people views for each respective participant by choosing a subset of the composed people views such that each face is presented in only one of the composed people views in the subset, and such that the subset includes the face of each participant. These candidate views can be considered "virtual camera" views as if each pair of participants had its own fixed "virtual" camera.

Step 513 includes mapping each people view to one or more voice directions, each voice direction determined by an audio process performed in audio processing element 209 is coupled to two or more microphones and that determines from which direction a voice comes, such that each determined voice direction is associated with one of the people views of the subset of people views.

Step 515 includes selecting one or more people views for transmission to remote endpoints, including, when the sound changes, e.g., a voice direction changes, switching between people views according to the sound direction.

Step 517 includes forming the video for the people views selected for transmission. In one embodiment, the video output is made of cuts or possibly cross fades between the candidate views—the virtual camera views. In one embodiment, multiple streams of such virtual camera views—the active people views—are formed for simultaneous transmission and viewing on multiple display screens at an endpoint.

In one embodiment the method includes switching automatically between a group shot, showing most or all of the local participants of the conference, and a people view, showing just one or two participants.

Step 519 includes encoding or transmitting the audio and those one or more people views selected in 515 and formed in step 517 for transmission to the endpoints of the teleconference.

In one embodiment, the people view composition of steps 503 to 513 of the method of FIG. 5 occurs at the beginning of a teleconference session.

One embodiment of the method is now described in more detail. The method uses camera views and constructs people views, each a rectangular region-of-interest within one of the camera views. A people view is essentially a close-up of a subset of the participants, e.g., two of the participants. The view construction occurs at the beginning of the session.

The face detection step 501 includes a face detection method reporting, for each view, the position, as an x, y coordinate of each face within the camera view, and a measure size of the face. As would be clear to one in the art, many face detection methods are known. The invention does not depend on any particular type of face detection method being used. One embodiment of face detection includes eye detection, and includes determining a face size measure according to the distance between the eyes of a face. Another method includes fitting elliptical shape, e.g., half ellipses to edges detected in the camera views to detect the face. In particular, one method is as described in commonly assigned U.S. patent application Ser. No. 12/021,198 to inventors Tian et al., filed Jan. 28, 2008 and titled REAL-TIME FACE DETECTION. Another is as described in commonly assigned U.S. patent application Ser. No. 12/031,590 to Applicants Tian, et al., filed Feb. 14, 2008 and titled REAL-TIME FACE DETECTION USING TEMPORAL DIFFERENCES.

Thus, in some embodiments, the face detecting includes at least one of eye detection and/or fitting an elliptical shapes to edges detected in the camera views corresponding to a face. In the case that only eye detection is used, the measure of size of the face is determined by the distance between the detected eyes of the face. In the case only elliptical shape fitting is used, the measure of the face is determined from properties of the elliptical shape fitted to the edges of a face.

The participant mapping step 503 includes, given the known location and angle of the cameras for each camera view, creating a map of the location of the faces in the room, using the (x, y) location of each face and the multiple views. The method includes converting the determined face size to a depth, that is, a distance from the camera, using the zoom factor of the camera that is known a priori. Thus, each face's approximate distance from the known camera position is determined. Since two or more cameras are used, the faces are matched and triangulation is used to determine their physical position in the room. The method thus locates each participant's face in the room.

The method includes unique face view selection. Step 505 includes identifying redundant views, including determining which face or faces appear(s) in more than one camera view but are co-located on the map. One embodiment includes verification, including approximate image comparison.

For unique face view selection, the method includes choosing one preferred camera view of each participant from among redundant camera views for any participant. For a particular participant, the best camera view is either the only one if there is only one camera view for the participant, or if more than one, the one in which the face is more head-on or a full-face view, as opposed to a profile view. For this, information from the face detection stage is used. For example, for methods that fit an ellipse or half-ellipse to each face, the widths of the ellipse of half for the same participant's are compared. In another embodiment, the location map of 503 is used and the camera view of the camera that is most opposite a participant's face is selected.

A desired composition is pre-determined. For example, one embodiment selects a 16:9 screen containing two participants side-by-side, with the two faces centered at certain positions, e.g., with the eyes nearest predefined locations on the screen and the faces being of a preselected size.

The composition element of determining candidate people views includes steps 507 and 509. Two (or more) faces that are adjacent in some camera view are candidates for a people view. A scaling factor (magnification or zoom) is chosen/determined for the group that optimizes face size for all. The faces are framed within the rectangle of the pre-determined desired composition. Thus, a candidate people view is composed for each pair (or more) of participants in a camera view.

One method includes evaluating candidate group views. One method includes computing a merit score based on the distance of the faces from the optimal position of the faces according to the pre-determined desired composition. The rectangle of the desired composition is moved to optimize the view, equivalent to carrying out electronic panning.

Step 511 includes selecting the composed people view for each participant, such that the selected composed people views include all the participants just once and have the highest total score.

During operation, the set of group views remains fixed. The views do not actively pan or tilt or zoom to follow movements. However if the scene changes more radically, the view selection method re-computes a new set of views. In one embodiment, a re-computation of the set of people views, i.e., steps 501-513 includes re-computing in the case the number of faces in one of the people views changes.

An example of operation is now presented. Some more details of some of the elements are now presented.

Figure 6:
FIG. 6 shows a line drawing from a photograph of an example of a wide angle camera view in a typical conference room for a video teleconference.

FIGS. 6-9 show line drawings produced from actual photographs. FIG. 6 shows an example of a wide angle camera view in a typical conference room for a video teleconference from a camera that is positioned approximately at the center of a display screen of the room. This is what is typically seen with a conventional prior art video teleconference system. This camera view also corresponds to what the camera view from camera 125 might be in an arrangement similar to that of FIG. 1C.

Figure 7:
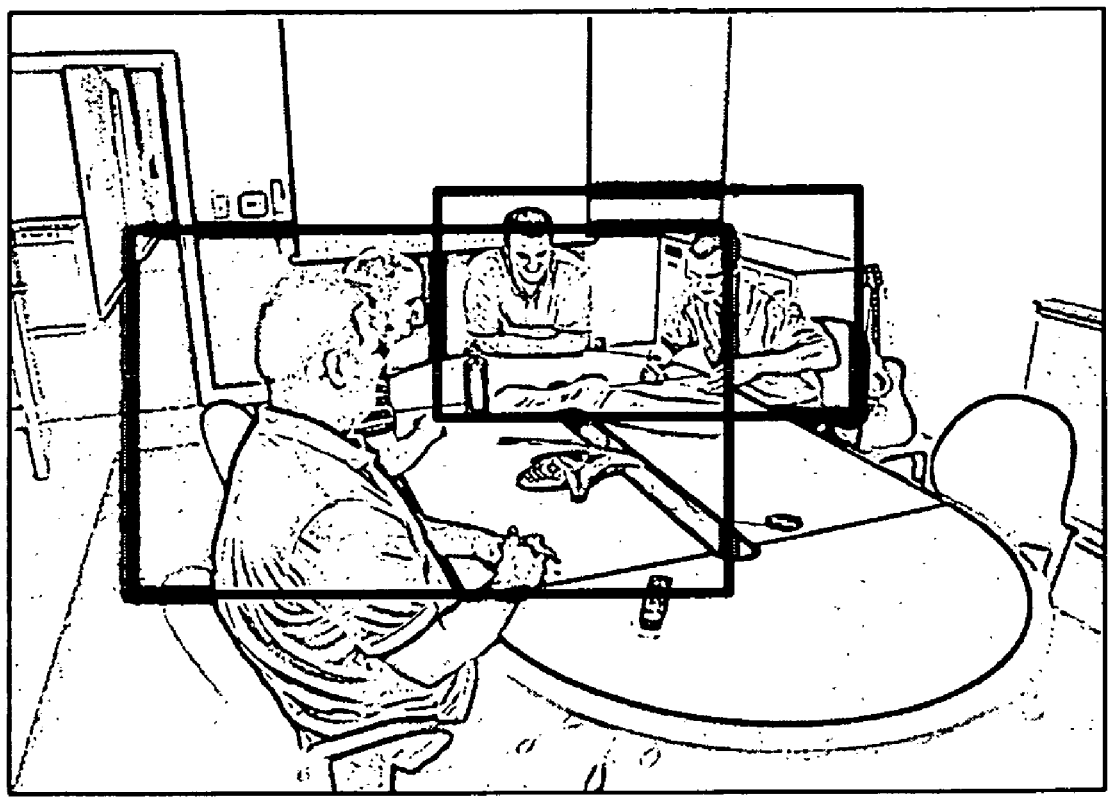
FIG. 7 shows a line drawing from a photograph of an example wide angle camera view from a camera on one side of a display screen, according to an embodiment of the present invention.

FIG. 7 shows a wide angle camera view from a camera on one side of the display screen, and corresponds to what the camera view from camera 121 might be in arrangements similar to those of FIGS. 1B and 1C. Also shown in FIG. 7 are the locations of two people composed views, each of two participants. The participant closest to the camera on the left of FIG. 7 obscures a participant behind him.

Figure 8:
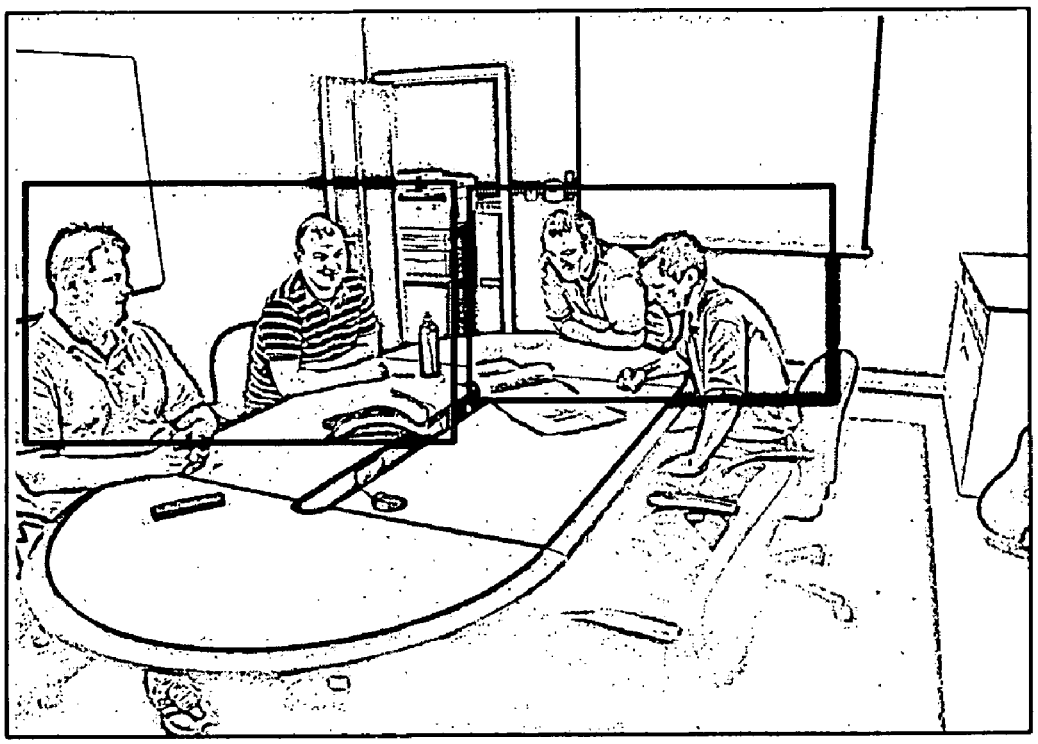
FIG. 8 shows a line drawing from a photograph of an example wide angle camera view from a camera on the opposite side of a display screen to that shown in FIG. 7, according to an embodiment of the present invention.

FIG. 8 shows a wide angle camera view from a camera on the other side of the display screen, and corresponds to what the camera view from camera 123 might be in arrangements similar to those of FIGS. 1B and 1C. Also shown in FIG. 8 are the locations of two composed people views, each of two participants.

Note that some participant appear in more than one people view. Furthermore, the participant hidden in the camera view of FIG. 7 now clearly appears close to face on in FIG. 8.

Figure 9:
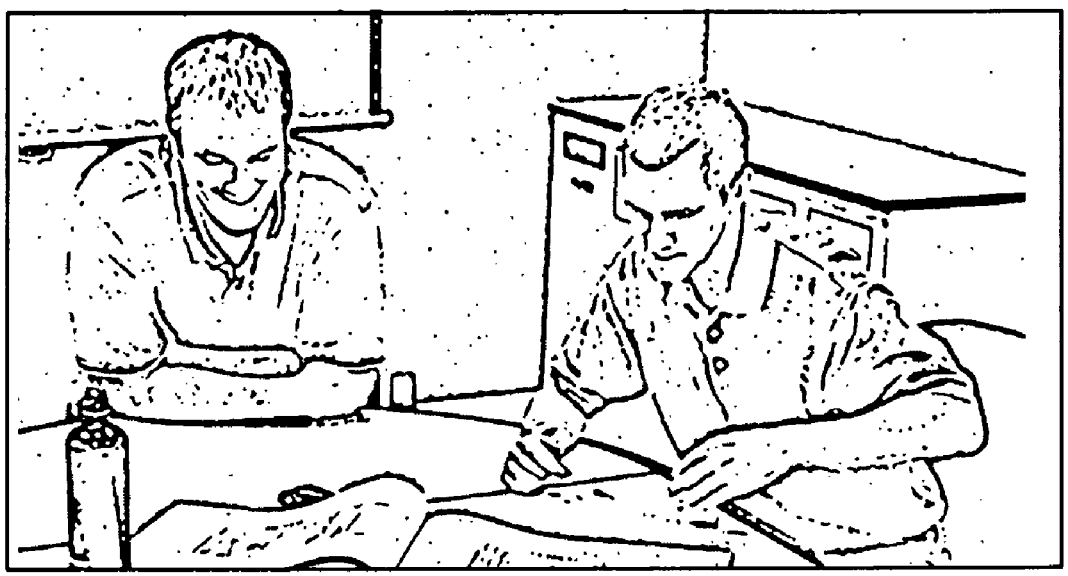
FIG. 9 shows a line drawing from a photograph of a people view that would be transmitted to a remote endpoint in the example shown in FIGS. 6 and 7, according to an embodiment of the present invention.

The candidate people views for each participant, e.g., for each microphone direction or angle are selected according to which is closer to a head on view. FIG. 9 shows the video people view that would be transmitted to remote endpoints for any of the two participants that are furthest from the camera for the camera view of FIG. 7, i.e., the two rightmost participants shown in FIG. 6.

The result is a set of virtual close-up cameras. These virtual cameras are then used in a multi-screen teleconference. The effective "life-size" images are very similar to those provided by existing "telepresence" teleconferencing systems, such as the CISCO CTS3000 Telepresence System, made by Cisco Systems, Inc., related to the assignee of the present invention. However, using an embodiment of the present invention does not require a fixed seating arrangement, because it automatically analyzes the scene and positions the virtual cameras to capture the correct "head and shoulder" people view.

Thus, described herein is a teleconference camera system that adapts to the seating positions of a number of participants in a room. One or more, typically two or more wide-angle cameras capture a group shot of the people, e.g., around a table, and uses captured video and audio information and automatically composes people views for "virtual cameras" and chooses between them to generate the life-size, close-up experience of a multi-camera "telepresence" system with fewer cameras with the cameras located on one side of the room.

An embodiment of the invention thus provides the benefits of current telepresence systems, e.g., close-up life-size images, from a conference room that was not specifically designed for telepresence. Rather than using fixed cameras and fixed seating positions, embodiments of the present invention use two or more camera that are located in the front near the screens, and this may be portable, to generate positions of multiple virtual cameras that adapt to the seating arrangement.

Thus, a system such as described herein can be dynamically deployed; it is not necessary to permanently mount the system in a specific location, but rather it may be moved to whatever room is convenient.

While in some embodiments, the processing to select the people view is relatively simple, in another embodiment, processing is carried our, e.g., in the EPTZ element and the composition element, to correct for at least some of the distortions that might be caused by the cameras 303 being at different location from the "virtual camera" locations being simulated. That is, the electronic pan-tilt-zoom element jointly with the composition element is further configured to construct head one views and correct for at least some of the distortions that occur because the cameras 303 do not take head-on views of the participants. One embodiment uses perspective correction. Such an embodiment uses a perspective model of straight lines that converge at a distant point and assume that each face is planar. Using the distances of each fitted face, e.g., the distance between eyes, or the width of a half-ellipse fitted, and the known locations of the camera, geometric transformations are applied to the cameras to correct for the distortion. More sophisticated methods also are possible that correct for any lens distortion caused by the wide angle camera lens. See for example Steve Mann and Rosalind Picard, "Virtual bellows: constructing high quality still from Video," Proceedings, First IEEE International Conference on Image Processing ICIP-94, Volume 1, 13-16 Nov. 1994, Page (s):363-367, Austin Tex., November 1994.

Those embodiments of the invention that include correction for distortion are not limited to any particular method of carrying out correction for distortions, and many such methods are known. See for example, Shum, H.-Y., and Sing, Bing Kang, "A review of image-based rendering techniques," in SPIE Proceedings Vol. 5067 (3), pp. 2-13, Proceedings of the Conference on Visual communications and image processing 2000, Perth, AUSTRALIA, 20-23 Jun. 2000 for a survey of a few such methods. Many more have been developed since that paper was written.

The method and the apparatuses described herein can be implemented in many different ways.

Figure 10:
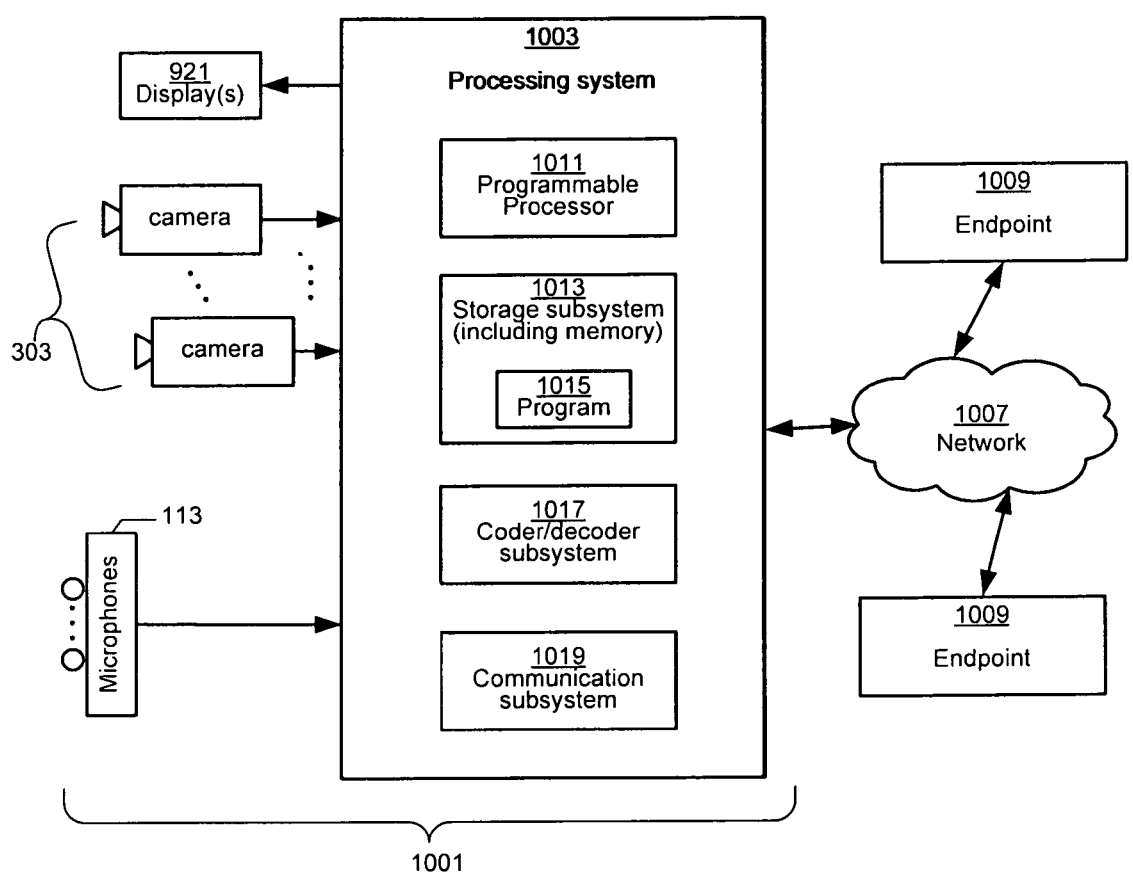
FIG. 10 shows a simplified block diagram of a teleconferencing system that includes teleconference terminal that includes an embodiment of the present invention, and that is coupled to a network to which at least one endpoint is also coupled.

FIG. 10 shows a simplified block diagram of a teleconferencing system that includes teleconference terminal 1001 coupled to a network 1007 to which at least one endpoint 1009 is also coupled so that a video teleconference can take place between the terminal 1001 and the at least one endpoint 1009. Terminal 1001 includes an embodiment of the present invention, e.g., that of FIG. 3. The terminal 1009 includes a plurality of video cameras 303, and a plurality of microphones 113. A different version implements the apparatus shown in FIG. 2, in which case the cameras are cameras 203. A set of one or more display screens 921 also is included.

A processing system 1003 includes at least one programmable processor 1011 and a storage subsystem 1013. The storage subsystem includes at least memory, and is encoded with software, shown as program 1015. Different version of the program 1015, when executed by the at least one processor 1011, causes the processing system 1003 to carry out the method embodiments described in this description. The processing system includes a coder/decoder subsystem 1017 that in one embodiment includes, for the video coding/decoding, a plurality of processors and memory, the memory including program code that causes the processors to execute a method such that the coder/decoder subsystem codes high definition video and/or decode high definition video. The processing system further includes a communication subsystem 1019 that, together with the at least one programmable processor 1011, takes care of communication aspects of operation of the terminal, and that includes an interface to the network 1007.

Of course those in the art will understand that the processing system 1003 is shown in simplified form only, without a lot of the inner working shown, in order not to obscure the inventive aspects of the present invention.

Thus, in one embodiment, a computer-readable storage medium is encoded with instructions that when executed by one or more processors of a processing system, e.g., in a virtual camera people view composition apparatus of a teleconferencing terminal, cause carrying out any of the methods described herein.

Unless specifically stated otherwise, as apparent from the following discussions, it is appreciated that throughout the specification discussions using terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" or "machine" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps is implied, unless specifically stated.

The methodologies described herein are, in one embodiment, performable by one or more processors that accept computer-readable (also called machine-readable) logic encoded on one or more computer-readable tangible media in which are encoded a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable medium that carries logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute a computer-readable medium on which is encoded logic, e.g., in the form of instructions.

Furthermore, a computer-readable medium may form, or be includes in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a medium in which are encoded a set of instructions, e.g., a computer program that are for execution on one or more processors, e.g., one or more processors that are part of an encoding system. Thus, as will be appreciated by those skilled in the art, embodiments of the present invention may be embodied as a method, an apparatus such as a special purpose apparatus, an apparatus such as a data processing system, or a medium, e.g., a computer program product. The computer-readable medium carries logic including a set of instructions that when executed on one or more processors cause the apparatus that includes the processor or processors to implement a method. Accordingly, aspects of the present invention may take the form of a method, an entirely hardware embodiment, an entirely software embodiment or an embodiment combining software and hardware aspects. Furthermore, the present invention may take the form of medium (e.g., a computer program product on a computer-readable storage medium) carrying computer-readable program code embodied in the medium.

While a medium is shown in an example embodiment to be a single medium, the term "medium" should be taken to include a single medium or multiple media (e.g., a centralized or distributed database, and/or associated caches and servers) that store the one or more sets of instructions. The term "medium" shall also be taken to include any medium that is capable of storing, encoding a set of instructions for execution by one or more of the processors and that cause the carrying out of any one or more of the methodologies of the present invention. A medium may take many forms, including tangible storage media. Non-volatile media includes, for example, optical, magnetic disks, and magneto-optical disks. Volatile media includes dynamic memory, such as main memory. For example, the term "medium" shall accordingly be taken to included, but not be limited to, solid-state memories, a computer product embodied in optical and magnetic media.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference unless such incorporation are not permitted by the relevant patent rules and/or statutes.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. An apparatus comprising:
a plurality of video cameras each configured to capture a respective camera view of at least some participants of a conference, the camera views together including at least one view of each participant;
a plurality of microphones;
an audio processing module coupled to the plurality of microphones and configured to generate audio data and direction information indicative of the direction of sound received at the microphones;
a face detection element coupled to the video cameras and configured to determine the location of each participant's face in each camera view and to determine which one or more faces are in more than one camera view;

a composition element coupled to the video cameras and the face detection element and configured to generate one or more candidate people views, each people view being of an area enclosing a head and shoulders view of at least one participant; and a video director element coupled to the composition element and to the audio processing module and configured to make a selection, according to the direction information, of which at least one of the candidate people views are to be transmitted to one or more remote endpoints, wherein each camera view is not necessarily a people view, wherein each people view provides an image of a size and layout and includes at least one participant, wherein each participant may appear in more than one people view, and wherein each participant appears in only one candidate people view and, when displayed remotely on a remote display screen, is displayed life size and facing the expected audience in the remote location at which the remote display screen is situated.

2. An apparatus as recited in claim 1, wherein the cameras are set to each generate a candidate people view, wherein the composition element is configured to make a selection of which at least one camera views is to be transmitted to the one or more remote endpoints according to the direction information, and wherein the apparatus further comprises:

a video selector element coupled to the video director and to the video cameras and configured to switch in, according to the selection by the video director, at least one of the camera views for compression and transmission to one or more remote endpoints.

3. An apparatus as recited in claim 1, further comprising an electronic pan-tilt-zoom element coupled to the video director and to the video cameras and configured to generate, according to the selected view information, video corresponding to the selected at least one of the candidate views for compression and transmission to one or more remote endpoints.

4. An apparatus as recited in claim 3, wherein each participant appears in only one people view.

5. An apparatus as recited in claim 3, wherein each participant may appear in more than one people view, and wherein the composition element includes a first composition element configured to compose people views, and a second composition element configured to select the candidate people views from the composed people view, such that each participant appears in only one candidate people view.

6. An apparatus as recited in claim 3, wherein the electronic pan-tilt-zoom element jointly with the composition element is further configured to construct head-on people views including correcting for at least some of the distortions that occur because the camera view corresponding to each people view does not include (a) head-on view(s) of the participant(s) in the people view.

7. An apparatus as recited in claim 3, wherein the composition element is further configured to carry out perspective correction.

8. A method of operating a processing system, the method comprising:

accepting a plurality of camera views of at least some participants of a conference, each camera view from a corresponding video camera, the camera views together including at least one view of each participant;

accepting audio from a plurality of microphones;

processing the audio from the plurality of microphones to generate audio data and direction information indicative of the direction of sound received at the microphones;

detecting any faces in the camera views and determining the location of each detected face in each camera view, and also determining which face or faces is or are in more than one camera view;

generating one or more candidate people views, each people view being of an area enclosing a head and shoulders view of at least one participant; and making a selection, according to the direction information, of which at least one of the candidate people views are to be transmitted to one or more remote endpoints, wherein each camera view is not necessarily a people view, wherein each people view provides an image of a size and layout and includes at least one participant, wherein each participant may appear in more than one people view, and wherein each participant appears in only one candidate people view and, when displayed remotely on a remote display screen, is displayed life size and facing the expected audience in the remote location at which the remote display screen is situated.

9. A method as recited in claim 8, wherein the accepted camera views are each a candidate people view, the method further comprising:

in response to the made selection, switching in at least one of the accepted camera views for compression and transmission to one or more remote endpoints.

10. A method as recited in claim 8, further comprising:

generating according to the selected view information, video corresponding to the selected at least one of the candidate views for compression and transmission to one or more remote endpoints.

11. A method as recited in claim 10, wherein each participant appears in only one people view.

12. A method as recited in claim 10, wherein each participant may appear in more than one people view, the method further comprising:

composing possible people views, and selecting the candidate people views from the composed possible people view, such that each participant appears in only one candidate people view.

13. A method as recited in claim 10, wherein the generating according to the selected view information including correcting for at least some of the distortions that occur because the camera view corresponding to each people view does not include (a) head-on view(s) of the participant(s) in the people view.

14. A method as recited in claim 10, wherein the generating according to the selected view information includes perspective correction.

15. A method of operating a processing system comprising:

for a plurality of camera views from corresponding video cameras in a room, detecting any faces in the camera view;

determining the location of participants in the room;

determining which face or faces is or are in more than one camera view;

for each subgroup of one or more adjacent faces, composing a people view, each people view being of an area enclosing a head and shoulders view of at least one participant;

selecting respective people views for each respective participant;

mapping each people view to one or more determined voice directions, such that each determined voice direction is associated with one of the people views; and selecting one or more people views for transmission to remote endpoints, wherein each camera view is not necessarily a people view, wherein each people view provides an image of a size and layout and includes at least one participant, wherein each participant may appear in more than one people view, and wherein each participant appears in only one candidate people view and, when displayed remotely on a remote display screen, is displayed life size and facing the expected audience in the remote location at which the remote display screen is situated, such that video for the people views selected for transmission can be formed.

16. A method as recited in claim 15, further comprising when a voice direction changes, switching between people views according to the sound direction.

17. A method as recited in claim 15, wherein the face detecting includes determining the position of each face within the camera view, and a measure of the size of the face.

18. A method as recited in claim 17, wherein the face detecting includes at least one of eye detection and/or fitting respective elliptical shapes to edges detected in the camera views corresponding to a face, and wherein in the case that only eye detection is used, the measure of size of the face is determined by the distance between the detected eyes of the face, and wherein in the case only elliptical shape fitting is used, the measure of the face is determined from properties of the elliptical shape fitted to the edges of a face.

19. A method as recited in claim 17, wherein each camera location is pre-determined, and wherein the method comprises determining each face's approximate distance from the pre-determined camera positions.

20. A non-transitory computer-readable medium having encoded thereon executable instructions that when executed by at least one processor of a processing system cause carrying out a method comprising:

for a plurality of camera views from corresponding video cameras in a room, detecting any faces in the camera views;

determining the location of participants in the room;

determining which face or faces is or are in more than one camera view;

for each subgroup of one or more adjacent faces, composing a people view, each people view being of an area enclosing a head and shoulders view of at least one participant;

selecting respective people views for each respective participant;

mapping each people view to one or more determined voice directions, such that each determined voice direction is associated with one of the people views; and selecting one or more people views for transmission to remote endpoints, wherein each camera view is not necessarily a people view, wherein each people view provides an image of a size and layout and includes at least one participant, wherein each participant may appear in more than one people view, and wherein each participant appears in only one candidate people view and, when displayed remotely on a remote display screen, is displayed life size and facing the expected audience in the remote location at which the remote display screen is situated, such that video for the people views selected for transmission can be formed.

* * * * *